US008670567B2

(12) United States Patent
Loc'H et al.

(10) Patent No.: US 8,670,567 B2
(45) Date of Patent: Mar. 11, 2014

(54) RECOVERY OF EXPIRED DECRYPTION KEYS

(75) Inventors: Julie Loc'H, Puteaux (FR); David Arditi, Clamart (FR); Sylvie Camus, Palaiseau (FR)

(73) Assignee: France Telecom, Paris (FR)

( * ) Notice: Subject to any disclaimer, the term of this patent is extended or adjusted under 35 U.S.C. 154(b) by 1260 days.

(21) Appl. No.: 12/096,426

(22) PCT Filed: Dec. 5, 2006

(86) PCT No.: PCT/FR2006/051284
§ 371 (c)(1),
(2), (4) Date: Jun. 6, 2008

(87) PCT Pub. No.: WO2007/066039
PCT Pub. Date: Jun. 14, 2007

(65) Prior Publication Data
US 2008/0292104 A1    Nov. 27, 2008

(30) Foreign Application Priority Data

Dec. 7, 2005  (FR) ...................................... 05 12473

(51) Int. Cl.
*H04L 9/00*        (2006.01)
(52) U.S. Cl.
USPC .......................................... 380/277; 713/171
(58) Field of Classification Search
USPC .......................................... 380/277; 713/171
See application file for complete search history.

(56) References Cited

U.S. PATENT DOCUMENTS

| 6,317,829 | B1 * | 11/2001 | Van Oorschot ............... 713/155 |
| 6,393,565 | B1 * | 5/2002 | Lockhart et al. .............. 713/172 |
| 6,792,113 | B1 * | 9/2004 | Ansell et al. .................. 380/284 |
| 2002/0126849 | A1 | 9/2002 | Howard, Jr. et al. |
| 2005/0120205 | A1 | 6/2005 | Umezawa et al. |
| 2005/0138374 | A1 * | 6/2005 | Zheng et al. .................. 713/166 |

OTHER PUBLICATIONS

Menezes et al., Handbook of Applied Cryptography, 1997, CRC Press LLC, USA, XP002390161, pp. 547-549; 551-553; 577-581.
Menezes et al., Handbook of Applied Cryptography, 1997, CRC Press, LLC, USA, pp. 547-549, 551-553 and 577-581.

* cited by examiner

*Primary Examiner* — Jeffrey Pwu
*Assistant Examiner* — Helai Salehi
(74) *Attorney, Agent, or Firm* — Knobbe Martens Olson & Bear LLP

(57) ABSTRACT

At least one expired decryption key intended to be used for asymmetrical decryption of encrypted data is recovered in a terminal after generation of a cryptographic encryption key/decryption key pair stored in a cryptographic medium such as a microchip card. The expired decryption key is stored in a database accessible to a user of the terminal and encrypted beforehand as a function of the new generated encryption key. In the terminal connected to the cryptographic medium, the encrypted expired encryption key is decrypted as a function of the decryption key stored in the cryptographic medium so that the encrypted data is decrypted as a function of the thus decrypted expired decryption key.

12 Claims, 4 Drawing Sheets

RECOVERY OF EXPIRED DECRYPTION KEYS

RELATED APPLICATIONS

The present application is based on, and claims priority from, FR Application Number 0512473, filed Dec. 7, 2005, and PCT Application No. FR06/051284, filed Dec. 5, 2006, the disclosures of which are hereby incorporated by reference herein in their entireties.

BACKGROUND OF THE INVENTION

1—Related Applications

The present invention relates to the field of asymmetrical encryption of confidential data. It relates more particularly to a method of recovering one or more expired decryption keys for decrypting data that was encrypted by means of an expired encryption key associated with that kind of expired decryption key.

2—Field of the Invention

In asymmetrical cryptography, for example cryptography using the RSA (Ron Shamir Adleman) algorithm, associating an encryption public key and a decryption private key, or a signature private key and a signature verification public key, the basic trusted object is the certificate. The certificate includes the following data: the public key to be certified, an identity of the holder of the public key, a validity period, a list of attributes corresponding to the rights of use of the key, for example a message signature key, and a cryptographic signature of the foregoing data by an encryption key of a certification authority issuing the certificate. The certification authority, also known as a PKI (Public Key Infrastructure), is responsible in particular for generating certificates and the associated private keys.

Once generated, the certificates and the private keys are stored either as software on a hard disk, a private key being encryptable by a respective password, or in a physical device, usually a secure microcontroller integrated into a microchip card or USB dongle. The invention relates more particularly to storing the certificate and the associated private key in a physical device, for better security. Decryption is effected (at least in part) directly in the physical device, so that the private key never leaves said physical device.

On the loss or deterioration of a private key, or in the event of normal renewal of a certificate/private key pair after a predetermined period of use, the user of the certificate and the private key revokes the certificate that has expired, and by association the private key also expires. The certification authority assigns the user a new certificate and a new private key. However, the user cannot use the new private key to decrypt data previously encrypted with the public key contained in the expired certificate.

In a first prior art implementation, the certification authority supplies the user with the expired private key.

In a first situation, the expired private key is supplied in software form, possibly encrypted using a password. This security is insufficiently reliable. The expired private key can be easily decrypted by a malicious person because the expired key is no longer stored in a secure physical device.

In a second situation, the expired private key is supplied in another physical device. Security is maintained to the detriment of practical and ergonomic aspects if the user has already renewed the private key and certificate several times and consequently is in possession of several physical devices.

In a third situation, the expired private key is supplied in another physical device which therefore contains a plurality of private keys that have successively expired in addition to the current private key and the current certificate. The storage capacity of the physical device is limited, however, and it cannot continue to receive private keys and certificates indefinitely.

In another prior art implementation, the certification authority supplies the encrypted data in clear, either by decrypting it using a copy of the expired private key, or by means of a direct recovery mechanism that does not necessitate the use of said expired private key. It is then indispensable for the data to be encrypted again, but using the public key included in the new certificate. This operation is referred to as transcryption and must be applied to all the encrypted data. The user is therefore subject to the constraint of sending the certification authority all the encrypted data, without forgetting any. Furthermore, the user may have several types of data encrypted by means of different applications, such as e-mails and encrypted hard disk partitions. Encrypting and decrypting such data is greatly dependent on the data storage format, which can differ from one application to another. In this case, it is necessary to create a different transcryption application for each type of data, which is costly and complicated.

SUMMARY OF THE INVENTION

To remove the drawbacks referred to above, a method of the invention for recovering at least one expired decryption key intended to be used for asymmetrical decryption of encrypted data in a terminal, after generation of a cryptographic encryption key/decryption key pair the decryption key whereof is intended to be used for the asymmetrical decryption of other data in the terminal, is characterized in that it includes decrypting a encrypted expired decryption key as a function of the generated decryption key, executed at least in part in a cryptographic medium connected to the terminal, to obtain said expired decryption key.

The invention therefore has the advantage that it provides a simple, economical and secure way to recover a private decryption key.

According to the invention, decryption of the encrypted data as a function of a generated encryption key called the current key and as a function of an expired encryption key is advantageously carried out transparently for an application of the terminal and therefore for a user of the terminal. No transcription of this data previously encrypted as a function of an expired encryption key is necessary because said data is decrypted directly in the terminal of the user, with the expired decryption key corresponding to the encryption key.

To make recovery of the expired decryption key more secure, decrypting the encrypted expired decryption key is preceded by storing the generated cryptographic encryption key/decryption key pair in the cryptographic medium, and storing the encrypted expired decryption key as a function of the generated encryption key in the database accessible to said user of the terminal.

Thus the expired decryption key, encrypted as a function of the encryption key of the generated cryptographic pair stored in the cryptographic medium is accessible to a user of the terminal without being stored in the cryptographic medium, with the result that the memory of said medium can be of small capacity.

According to one feature of the invention, storing the expired decryption key is preceded by the following steps executed in a certification authority device:

obtaining the expired decryption key by decrypting an encrypted expired decryption key as a function of an administrator decryption key, the generated decryption keys being encrypted beforehand as a function of an administrator encryption key;

encrypting the decrypted expired decryption key as a function of the generated encryption key; and making the previously encrypted expired description key available to the user of the terminal.

This feature has the advantage that it provides strong protection against access to the expired decryption key by an unauthorized third party, without having to protect transmission of said encrypted expired decryption key from the certification authority device to the user of the terminal.

According to another feature of the invention, decrypting the encrypted expired decryption key includes:

searching in the database accessible to the user of the terminal for a encrypted expired decryption key that is required and identified by an application of the terminal; and commanding decryption of the encrypted expired decryption key, executed at least in part in the cryptographic medium connected to the terminal, as a function of the generated decryption key stored in the cryptographic medium, in order to obtain the expired decryption key for decrypting the encrypted data.

The expired decryption keys are advantageously transmitted to the terminal in a secure manner as they are encrypted with the current encryption key and are decrypted as a function of the current decryption key stored in the cryptographic medium.

The cryptographic medium can conveniently take the form of a microchip card.

The invention also relates to a system for recovering at least one expired decryption key intended to be used for asymmetrically decrypting data encrypted in a terminal, after generation of a cryptographic encryption key/decryption key pair the decryption key whereof is intended to be used for asymmetrical decryption of other data in the terminal, characterized in that it includes:

means for storing the generated cryptographic encryption key/decryption key pair in a cryptographic medium intended for a user of the terminal;

means for storing an encrypted expired decryption key as a function of the generated encryption key in a database accessible to said user of the terminal; and a decryption management module for obtaining the expired decryption key by commanding decryption of the encrypted expired decryption key as a function of the generated decryption key, executed at least in part in the cryptographic medium connected to the terminal.

The invention still concerns a decryption management module for recovering at least one expired decryption key intended to be used for asymmetrically decrypting data encrypted in a terminal, after generation of a cryptographic encryption key/decryption key pair the decryption key whereof is intended to be used for asymmetrical decryption of other data in the terminal. The decryption management module is characterized in that it includes means for obtaining said expired decryption key by commanding decryption of an encrypted expired decryption key, executed at least in part in a cryptographic medium connected to the terminal, as a function of the generated encryption key stored in said cryptographic medium.

The invention also concerns a data processing terminal including a decryption management module according to the invention.

Finally, the invention relates to a computer program that can be executed in the expired decryption key recovering system of the invention. The program includes instructions which, when the program is executed in said system, execute the steps of the method of the invention.

BRIEF DESCRIPTION OF THE DRAWINGS

Other features and advantages of the present invention will become more clearly apparent on reading the following description of embodiments of the invention, given by way of nonlimiting example, with reference to the corresponding appended drawings, in which.

DESCRIPTION OF THE EMBODIMENTS

Referring to FIGS. 1 to 4, and for a better understanding of the invention, it is assumed that a user of a terminal T has a cryptographic pair combining a current certificate $C_{N-1}$ with a current secret decryption private key $S_{N-1}$, with the index N such as N>0. The certificate $C_{N-1}$ includes particularly a current encryption public key $P_{N-1}$. The user also has old expired cryptographic pairs $C_0/S_0$ to $C_{N-2}/S_{N-2}$, respectively, each expired certificate $C_0$ to $C_{N-2}$ including a respective public key $P_0$ to $P_{N-2}$. The user then damages or loses the current private key $S_{N-1}$, or has the current cryptographic pair $C_{N-1}/S_{N-1}$ renewed in the normal way, after a predetermined period of use. The user then revokes the current cryptographic pair $C_{N-1}/S_{N-1}$ via a certification authority in order to obtain another cryptographic pair $C_N/S_N$, the other certificate $C_N$ including another public key $P_N$. The revoked certificate $C_{N-1}$ and the revoked private key $S_{N-1}$ are deemed to have expired.

An object of the invention is to recover at least one $S_n$ of the expired decryption private keys $S_0$ to $S_{N-1}$, where $0 \leq n \leq N-1$, in order to decrypt, in a manner that is transparent for the user and directly in the terminal T of the user, data previously encrypted in a terminal of a second user employing an asymmetrical cryptography algorithm and as a function of an expired encryption public key $P_n$ associated with the expired private key $S_n$ to be recovered.

The expired decryption key recovering method in accordance with the invention is implemented in an expired decryption key recovering system. The method comprises a recovery set-up phase in a certification authority device belonging to the certification authority and at the time of generating another cryptographic pair $C_N/S_N$ intended for the "first" user of the terminal T (FIGS. 1 and 3) and a phase of applying the recovery process in the terminal of the first user at the time of decrypting data coming from the terminal of the second user (FIGS. 2 and 4).

Figure 1:
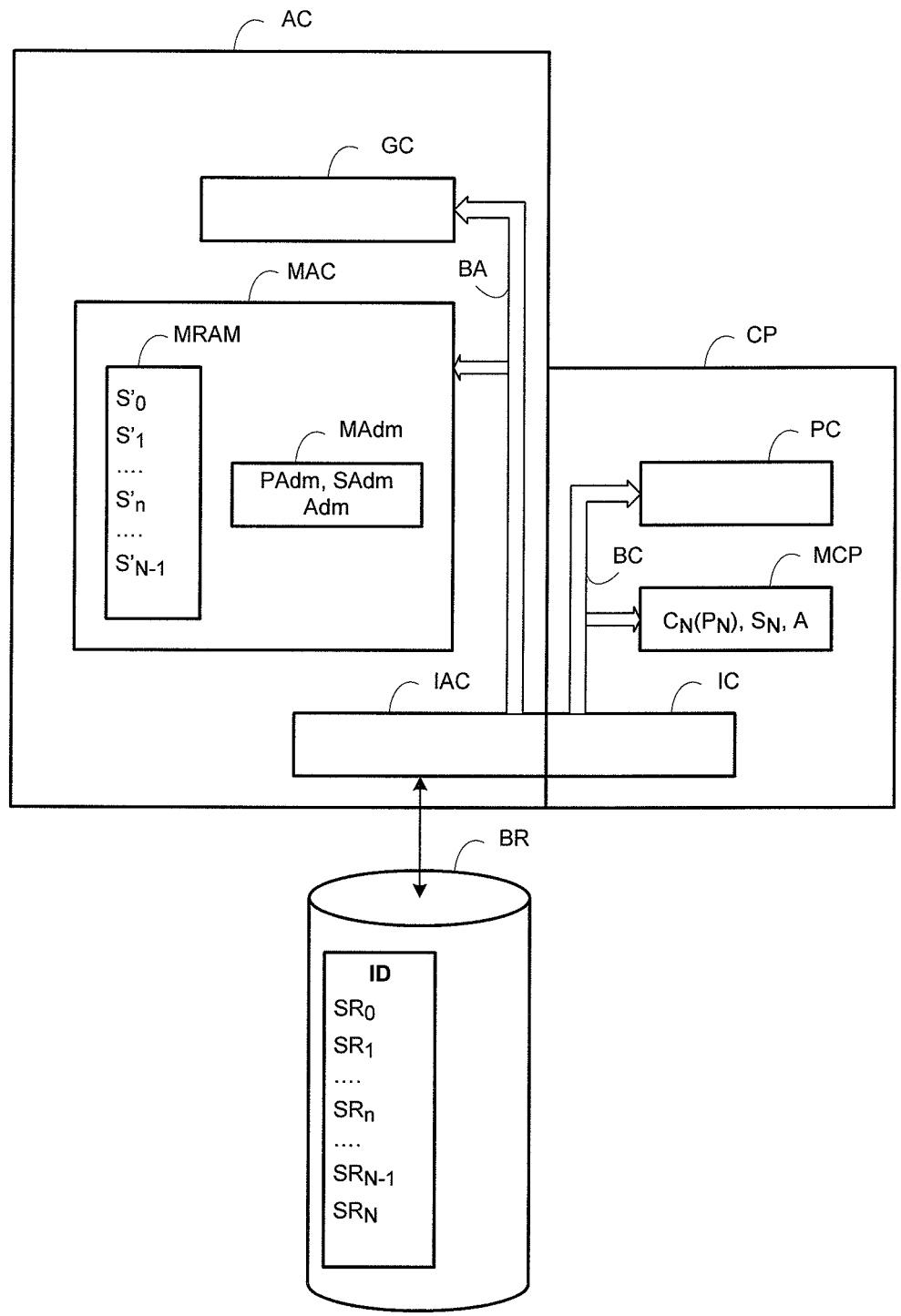
FIG. 1 is a schematic block diagram of means in an expired decryption key recovering system of the invention used to renew user certificates.
Figure 2:
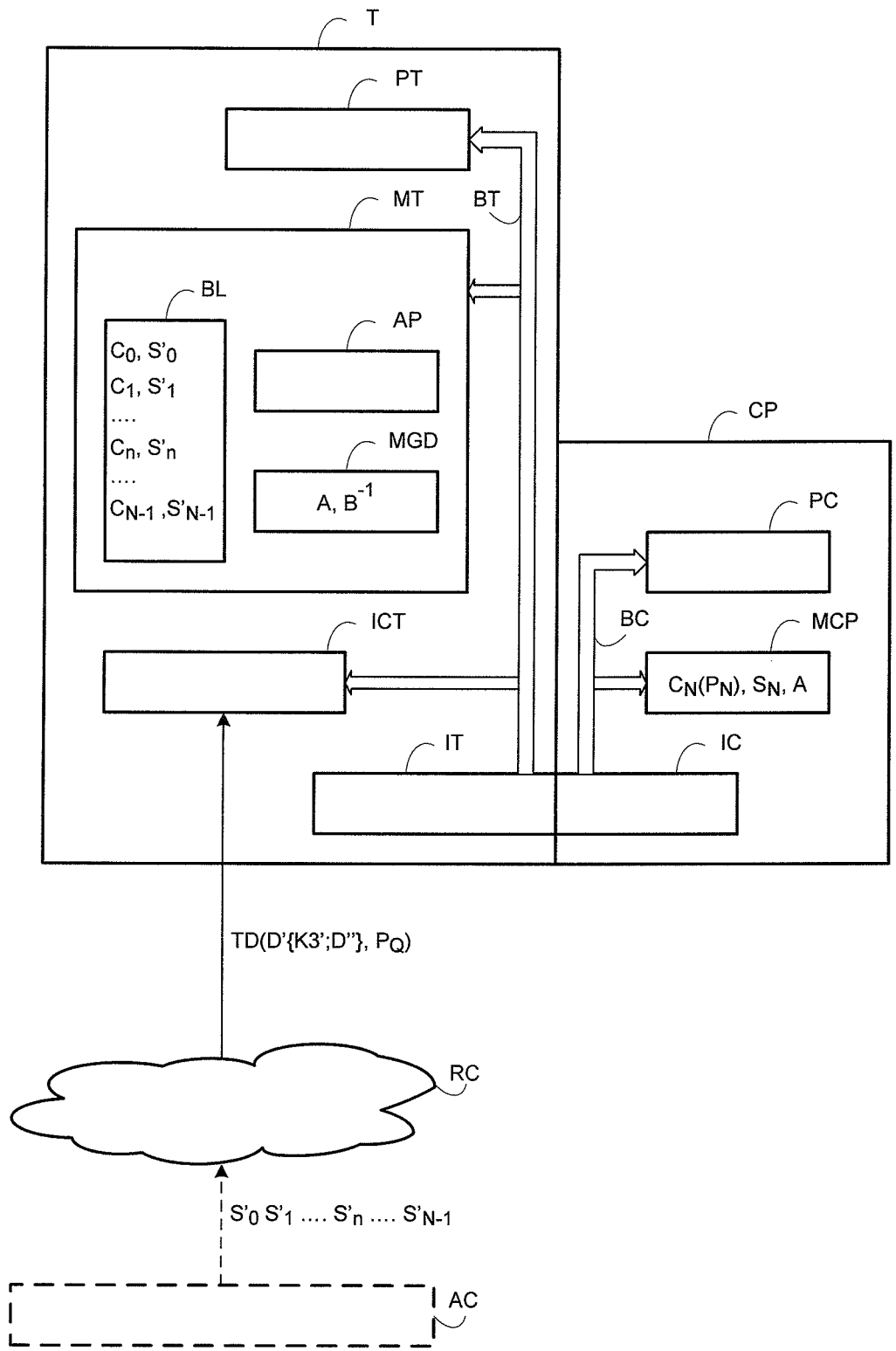
FIG. 2 is a block diagram of means in the expired decryption key recovering system of the invention used for decrypting data.

Referring to FIG. 1, recovery in accordance with the invention is set up by the certification authority in a certification authority device AC connected by a contact or contactless link to a portable cryptographic medium of microchip card (CP) or USB dongle type.

In the remainder of the description, the portable cryptographic medium is assumed to be the microchip card CP which is intended to include the other cryptographic pair $C_N/S_N$ after recovery is set up.

The certification authority device AC and the microchip card CP are represented in FIG. 1 as functional blocks which for the most part execute functions linked to the invention and can be software and/or hardware modules.

The certification authority device AC comprises a certification manager GC for generating at least one cryptographic pair $C_N/S_N$, memories MAC, and an interface IAC connected by a contact or contactless link to the microchip card CP. The various components of the certification authority device AC are interconnected by a bidirectional bus BA.

The memories MAC comprise a volatile memory MRAM used more particularly for processing data and an administrator memory MAdm including a unique encryption private key PAdm, a unique decryption public key SAdm, and an asymmetrical cryptographic algorithm Adm.

Alternatively, the administrator private key SAdm is also stored in a cryptographic medium.

The certification authority device AC comprises or is connected to a recovery database BR that includes all the expired private keys and encrypted current keys of users who have submitted at least one request for a cryptographic pair. In particular, the recovery database comprises, as shown in FIG. 1, the encrypted private keys $SR_0$ to $SR_{N-1}$ grouped under an identifier ID of the user of the terminal T having revoked a cryptographic pair for the $N^{th}$ time. The private keys $SR_0$ to $SR_{N-1}$ are encrypted asymmetrically as a function of the administrator public key PAdm stored in the memory MAdm.

The memory MRAM comprises, after recovery is set up, the expired private keys $S'_0$ to $S'_{N-1}$ of the user, encrypted asymmetrically as a function of the recent current public key $P_N$.

The microchip card CP further comprises a memory MCP and an interface IC to be connected to the interface IAC of the device, a processor PC for storing in the memory MCP the generated cryptographic pair $C_N/S_N$, and an asymmetrical cryptographic algorithm A if the card is connected to the device AC, and for decrypting data or expired private keys encrypted as a function of the public key $P_N$ stored in the memory MCP of the microchip card, if the card is connected to the terminal T of the user.

The memory MCP is a non-volatile memory, for example an EEPROM or flash memory. The microchip card can also comprise volatile RAM, not shown, used more particularly for processing data.

The various components of the microchip card CP are interconnected by a bidirectional bus BC.

The microchip card CP including the other cryptographic pair previously contained the old certificate $C_{N-1}$/private key $S_{N-1}$ pair eliminated before registering the new certificate $C_N$/private key $S_N$ pair.

The microchip card can be a new card, for example if the user has lost the old microchip card.

Referring to FIG. 2, to apply recovery, the terminal T of the user is connected by a contact or contactless link to the microchip card CP that contains the cryptographic pair $C_N/S_N$ newly generated by the certification authority device AC. The terminal is connected to a communication network RC and receives via the network RC at least one data frame TD coming from a second user terminal also connected to the network RC. The data frame TD includes encrypted data D' and the public key $P_Q$, or an identifier of the latter, used at the time of asymmetrical encryption of the data D' in the terminal of the second user. The public key $P_Q$ is either an expired public key $P_0$ to $P_{N-1}$ or the current key $P_N$.

The communication network can be an Internet type packet network, for example, or a GSM (Global System for Mobile communications), GPRS (General Packet Radio Service), or UMTS (Universal Mobile Telecommunications System) cellular radio communication network.

Referring to step E10 in FIG. 4, and in a manner known in the art, the data D' includes a pair associating an encrypted session key K3' and encrypted data D". In the terminal of the second user, the data D" is obtained by encrypting data D of any length using a symmetrical cryptographic algorithm B having a random session key K3. The random session key K3 is encrypted to yield an encrypted session key K3' by the asymmetrical cryptographic algorithm A using the public key $P_Q$ known to the terminal of the second user. The data D is therefore not encrypted directly as a function of the public key $P_Q$, an asymmetrical cryptographic algorithm processing data only of a size smaller than the encryption public key.

The terminal T is represented in FIG. 2 in the form of functional blocks which for the most part execute functions linked to the invention and can be software and/or hardware modules.

The terminal comprises a processor PT, memories MT, an interface IT connected by a contact or contactless link to the interface IC of the microchip card CP, and a communication interface ICT for receiving the data frame TD transmitted from a second user terminal via the communication network RC. The various components of the terminal T are interconnected by a bidirectional bus BT.

The memories MT comprise a local database BL that contains all the expired cryptographic pairs including the expired keys $S'_0$ to $S'_{N-1}$ that are encrypted asymmetrically as a function of the recent public key $P_N$. The encrypted expired keys $S'_0$ to $S'_{N-1}$ were transmitted, after recovery was set up, from the certification authority device AC to the terminal T either via a physical device including said keys or directly via a communication network such as the Internet linking a communication interface of the certification authority device AC to the communication interface ICT of the terminal T or to a server that the terminal T can consult.

The memories MT also comprise one or more data processing applications AP, such as an e-mail management application and an Internet browser, which necessitate decryption of received encrypted data. A decryption management module MGD is contained in the memories MT and comprises low-level operations such as electronic signature, electronic signature verification, and data encryption and decryption. The decryption management module comprises an asymmetrical cryptographic algorithm A and an inverse symmetrical cryptographic algorithm $B^{-1}$ used to decrypt the data D". The decryption management module is a software interface between the physical interface IT connected to the microchip card CP and the applications AP. The module MGD is of the PKCS#11 (Public Key Cryptography Standard) or CSP (Crypto Service Provider) programming interface type.

The terminal T can be a personal computer or any other electronic telecommunication device or object personal to the user of the method, such as a communicating personal digital assistant PDA. It can equally be a portable or non-portable domestic terminal such as a video games console or an intelligent television receiver.

Figure 3:
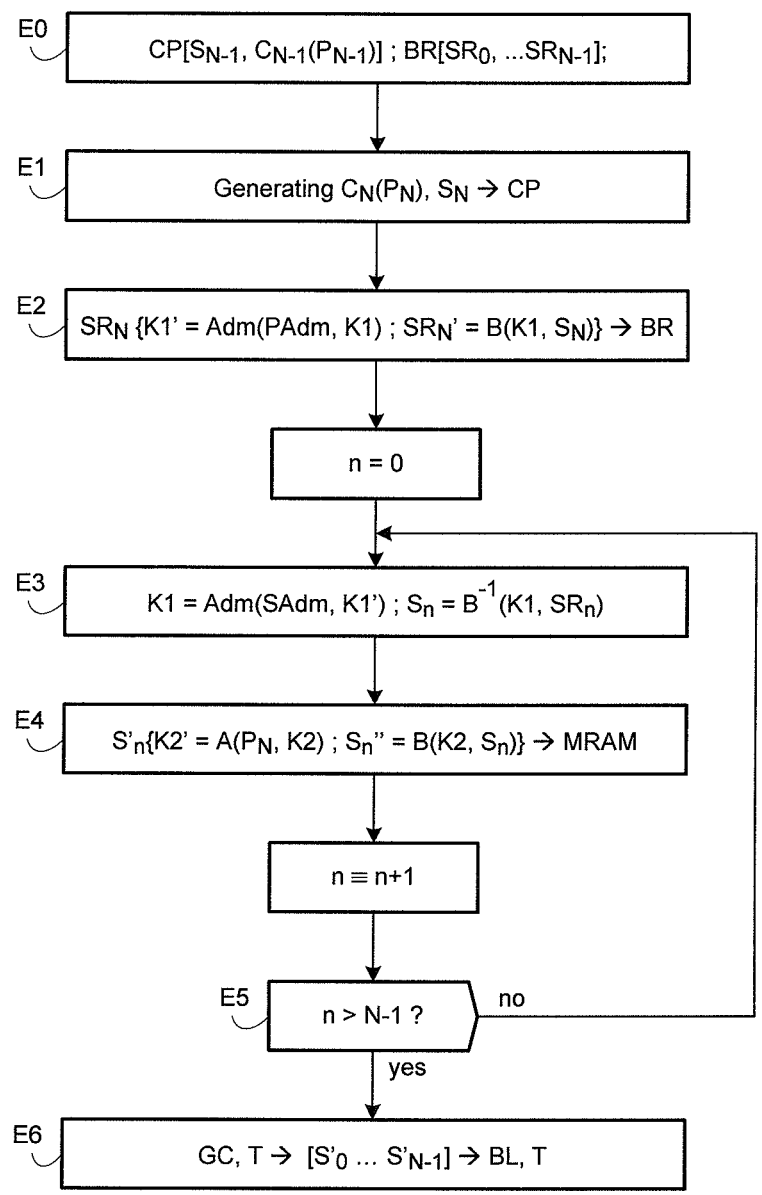
FIG. 3 shows a user certificate renewal algorithm included in an expired decryption key recovering method of the invention.
Figure 4:
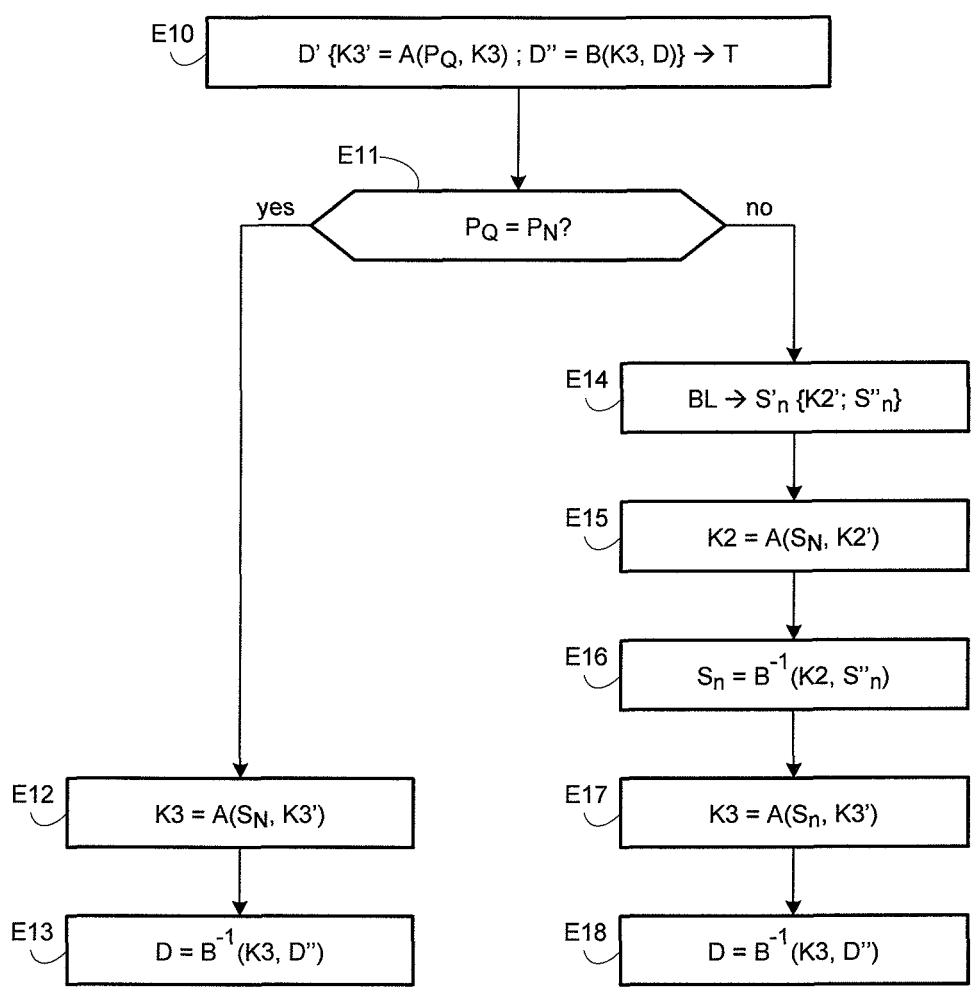
FIG. 4 shows a data decrypting algorithm included in the expired decryption key recovering method of the invention.

Referring to FIG. 3, the recovery set-up phase of the expired private key recovery method includes steps E0 to E6.

The step E0 refers to the initial state prior to revocation of the cryptographic pair $C_{N-1}/S_{N-1}$ included in the microchip card CP of the user of the terminal T. The recovery database BR connected to the certification authority device AC comprises all the expired and current encrypted private keys $SR_0$ to $SR_{N-1}$ belonging to the user and grouped in the database BR under the user's identifier ID.

When the user revokes the cryptographic pair $C_{N-1}/S_{N-1}$ with a certification authority, that pair is deemed to have expired. The user is identified to the certification authority, for example by entering the identifier ID on a keyboard connected to or integrated into the certification authority device AC. Following identification of the user, the certification manager GC of the certification authority device AC generates, in the step E1, another cryptographic pair $C_N/S_N$, referred to in the remainder of the description as the "current pair", associating the current certification $C_N$ and the current private key $S_N$. The certificate $C_N$ and the private key $S_N$ are transmitted to the microchip card CP connected to the device AC via the interface IAC of the device AC and the interface IC of the microchip card CP, and are stored by the processor PC of the card in the memory MCP of the card CP.

Alternatively, the card CP contains the revoked old pair $C_{N-1}/S_{N-1}$ and the processor PC of the card deletes the expired pair $C_{N-1}/S_{N-1}$ from the memory MCP of the card before storing the other current pair $C_N/S_N$.

The microchip card is then given to the user, who connects it to the interface IT of the terminal T in order to decrypt data in the microchip card as a function of the private key $S_N$.

In another embodiment, the cryptographic pair $C_N/S_N$ generated by the certification authority device AC is transmitted, for example by post or by hand, to the user of the terminal, who enters the cryptographic pair on a keyboard of the terminal in order to store it via the terminal in the microchip card PC connected to the terminal T.

The certification authority device discloses the current encryption public key $P_N$ to other users liable to transmit encrypted data via their terminals to the terminal T of the user holding the microchip card CP including the other cryptographic pair $C_N/S_N$. The disclosure is established, for example, by storing the public key $P_N$ in a directory accessible to, or broadcast to, user terminals sending encrypted data.

In the step E2, the certification manager GC encrypts the current private key $S_N$ by applying an asymmetrical cryptographic algorithm using the administrator public key PAdm to obtain an encrypted current private key $SR_N$ to be stored in the recovery database BR under the identifier ID of the user. As for the data D encrypted in the terminal of the second user, the current private key is not encrypted directly as a function of the administrator public key PAdm. The private key $S_N$ of any length is encrypted by applying an asymmetrical cryptographic algorithm B using a random first session key K1, which produces an encrypted private key $SR_N'$. The random first session key K1 is encrypted to yield an encrypted first session key K1' by applying an asymmetrical cryptographic algorithm Adm using the public key PAdm. The pair combining the encrypted first session key K1' and the encrypted private key $SR_N'$ corresponds to the private key $SR_N\{K1'; SR_N'\}$.

The steps E3 and E4 correspond to processing an expired private key $SR_n$, with the index n lying between 0 and N−1, stored in the recovery database BR under the identifier ID in order to recover the corresponding expired private key $S_n$. The steps E3 and E4 are repeated N times until all the encrypted expired private keys stored in the recovery database BR have been processed.

In the step E3, the certification manager GC looks for the encrypted private key $SR_n$ in the recovery database BR and encrypts it as a function of the administrator private key SAdm in order to obtain the corresponding decrypted expired private key $S_n$. In a manner that is the reciprocal of encrypting the current private key in the step E2, the expired key $SR_n\{K1'; SR_n'\}$ is decrypted indirectly by decrypting the keys K1' and $SR_n'$. The first session key K1 is obtained by decrypting the encrypted first session key K1' by applying the asymmetrical cryptographic algorithm Adm using the administrator private key SAdm. The expired private key $S_n$ is then obtained by decrypting the encrypted key $SR_n$ by applying the inverse symmetrical cryptographic algorithm $B^{-1}$ using the decrypted first session key K1.

In the step E4, the certification manager GC encrypts the key $S_n$ previously decrypted by applying an asymmetrical cryptographic algorithm A using the current public key $P_N$ newly generated in the step E1. The expired private key $S_n$ is not encrypted directly as a function of the current public key $P_N$. The private key $S_n$ of any length is encrypted by applying a symmetrical cryptographic algorithm B using a second random session key K2, which produces an encrypted private key $S_n''$. The second random session key K2 is encrypted to yield a second encrypted session key K2' by applying an asymmetrical cryptographic algorithm A using the current public key $P_N$. The pair combining the second encrypted session key K2' and the encrypted private key $S_n''$ corresponds to the private key $S_n'\{K2'; S_n''\}$.

The encrypted expired private key $S_n'\{K2'; S_n''\}$ obtained is stored in the memory MRAM of the certification authority device AC. In the step E5, the certification manager GC executes the steps E3 and E4 until all the encrypted expired private keys $SR_0$ to $SR_{N-1}$ stored in the recovery database BR have been processed.

In the step E6, once all the encrypted expired private keys $SR_0$ to $SR_{N-1}$ stored in the recovery database have been processed, the certification manager GC makes the newly encrypted expired private keys $S'_0$ to $S'_{N-1}$ available to the terminal T of the user in the local database BL in corresponding relationship to the respective associated certificates $C_0$ to $C_{N-1}$, overwriting old expired private keys encrypted asymmetrically as a function of the most recently expired public key $P_{N-1}$.

In a first example, the certification authority device AC transmits the keys $S'_0$ to $S'_{N-1}$ directly to the terminal T via the communication network RC, such as the Internet, which connects a communication interface of the certification authority device AC, represented in dashed line in FIG. 2, to the communication interface ICT of the terminal T.

In a second example, transmission is effected by storing the keys $S'_0$ to $S'_{N-1}$ in a removable physical device connected to the interface IAC of the certification authority device AC, the physical device being then given to the user, who connects it to the interface IT of the terminal in order to store the keys $S'_0$ to $S'_{N-1}$ in the local database BL. In the example shown in FIGS. 1 and 2, the physical device is the microchip card CP and the expired private keys $S'_0$ to $S'_{N-1}$ are stored in the memory MCP of the card.

In a third example, the expired private keys $S'_0$ to $S'_{N-1}$ are stored in a non-modifiable database of a read-only server. The user accesses the database via a radio communication network of Internet type, for example.

Referring to FIG. 4, the recovery application phase of the expired private key recovering method in the terminal T connected to the microchip card CP comprises the steps E10 to E18.

The step E10, described hereinabove, corresponds to encrypting the data D in the terminal of the second user before transmission in the form of a data frame TD to the terminal of the first user via the network RC. The data frame TD includes the public key $P_Q$ or an identifier of the public key, and the pair $D'\{K3', D''\}$ including the encrypted session key K3' obtained by asymmetrically encrypting the session key K3 as a function of the public key $P_Q$, and the data D" obtained by symmetrically encrypting the data D as a function of the unencrypted session key K3.

After reception of the data frame TD by the communication interface IC, the application AP activated by the processor PT processes the frame TD and activates the decryption management module MGD by transmitting a decryption request with a view to decrypting the data D', the request including the sent public key $P_Q$ or its identifier. The module MGD receives the decryption request and, in the step E11, compares the public key $P_Q$ to the public key $P_N$ included in the certificate $C_N$ stored in the microchip card connected to the interface IT of the terminal, and then, where applicable, in the step E14, to the public keys $P_0$ to $P_{N-1}$ in the local database BL.

If the public key $P_Q$ extracted from the received frame is identical to the public key $P_N$ stored in the microchip card, the decryption management module MGD manages decryption in a manner known in the art to yield the decrypted data D. In the step E12, the module MGD activates decryption in the microchip card by sending a decryption command including the session key K3' to the processor PC, which causes the asymmetrical cryptographic algorithm A to be applied to the session key K3' by using the private key $S_N$ included in the memory MCP of the microchip card. Thus the step E12 is executed in the microchip card CP. The microchip card then transmits the decrypted session key K3 to the decryption management module MGD.

In the step E13, the decryption management module MGD decrypts the encrypted data D" by applying thereto the inverse symmetrical cryptographic algorithm $B^{-1}$ using the decrypted session key K3 and transmits the decrypted data D obtained to the application AP.

Alternatively, the step E13 is executed by the application AP. Another alternative is for the step E13 to be executed in the microchip card CP serving as a hardware security module (HSM) and which contains in the memory MCP the inverse symmetrical cryptographic algorithm $B^{-1}$.

If the public key $P_Q$ is different from the public key $P_N$ stored in the microchip card, the decryption management module MGD looks for the encrypted private key $S'_n$ corresponding to the public key $P_n$, where $0 \leq n \leq N-1$, by comparing, in the step E14, the public key $P_Q$ to all the expired public keys $P_0$ to $P_{N-1}$ successively extracted from the expired certificates $C_0$ to $C_{N-1}$ stored in the local database BL. As soon as a public key $P_n$ is found to be identical to the received public key $P_Q$, the module MGD takes the encrypted private key $S'_n\{K2'; S_n"\}$ corresponding to the public key $P_n$ from the local database BL.

In the step E15, the module MGD sends a decryption command including the second session key K2' to the processor PC in the microchip card, which causes the asymmetrical cryptographic algorithm A to be applied to the session key K2' by using the private key $S_N$ included in the memory MCP of the microchip card, in order to obtain the decrypted session key K2. The step E15 is therefore executed in the microchip card CP. The microchip card transmits the decrypted second session key K2 to the decryption management module MGD.

In the step E16, the decryption management module MGD decrypts the encrypted expired private key $S_n"$ by applying to it the inverse symmetrical cryptographic algorithm $B^{-1}$ using the decrypted second session key K2 to obtain the decrypted expired private key $S_n$.

In the step E17, the module MGD decrypts the encrypted third session key K3' by applying the asymmetrical cryptographic algorithm A using the expired private key $S_n$ previously decrypted to obtain the decrypted third session key K3.

In the step E18, the decryption management module MGD decrypts the encrypted data D" by applying to it the inverse symmetrical cryptographic algorithm $B^{-1}$ using the third session key K3 previously decrypted and transmits to the application AP the decrypted data D obtained.

Alternatively, the steps E15 to E17 are executed by the processor PC of the microchip card, the memory MCP of the card containing the inverse symmetrical cryptographic algorithm $B^{-1}$. In this variant, the microchip card constitutes the hardware security module HSM.

The invention described here relates to a method and a system for recovering expired decryption keys. In a preferred embodiment, the steps of the method of the invention are determined by the instructions of a computer program incorporated in the system. The program includes program instructions which, when said program is executed in the system, the operation whereof is then controlled by the execution of the program, execute the steps of the method according to the invention.

Consequently, the invention also applies to a computer program, in particular a computer program stored on or in a storage medium readable by a computer and by any data processing device adapted to implement the invention. This program can use any programming language and take the form of source code, object code or an intermediate code between source code and object code, such as a partially compiled form, or any other form desirable for implementing the method according to the invention.

The storage medium can be any entity or device capable of storing the program. For example, the medium can include storage means in which the computer program according to the invention is stored, such as a ROM, for example a CD ROM or a microelectronic circuit ROM, a USB key, or magnetic storage means, for example a diskette (floppy disk) or a hard disk.

The program according to the invention can in particular be downloaded over an Internet type network.

Alternatively, the information medium can be an integrated circuit in which the program is incorporated, the circuit being adapted to execute or to be used in the execution of the method according to the invention.

The invention claimed is:

1. A method of recovering at least one expired decryption key used by a processor for asymmetrical decryption of encrypted data in a terminal, said expired decryption key having been suppressed after generation by a certification authority device and before registration of a current cryptographic encryption key/decryption key, said generated current decryption key being used by the processor for the asymmetrical decryption of other data in the terminal, said method including receiving from the certification authority device said expired decryption key stored by the certification authority and encrypted as a function of the generated current encryption key, decrypting the encrypted expired decryption key as a function of the generated current decryption key, executed at least in part in a cryptographic medium connected to said terminal, to obtain said expired decryption key, said expired decryption key being initially securely stored in an encrypted form using a certificate authority encryption key.

2. A method as claimed in claim 1, wherein decrypting said encrypted expired decryption key is preceded by storing the generated current cryptographic encryption key/decryption key pair in the cryptographic medium, and storing said encrypted expired decryption key as a function of the generated current encryption key in a database accessible to said user of said terminal.

3. A method as claimed in claim 1, wherein decrypting said encrypted expired decryption key includes the following steps: searching in said database accessible to said user of said terminal for an encrypted expired decryption key that is required and identified by an application of said terminal; and commanding decryption of said encrypted expired decryption key, executed at least in part in said cryptographic medium connected to said terminal, as a function of the generated decryption key stored in said cryptographic medium, in order to obtain the expired decryption key for decrypting the encrypted data.

4. A method as claimed in claim 1, wherein said cryptographic medium is a microchip card.

5. A method as claimed in claim 2, wherein storing said expired decryption key is preceded by the following steps executed in a certification authority devices: obtaining said expired decryption key by decrypting an encrypted expired decryption key as a function of an administrator decryption key, the generated decryption keys being encrypted beforehand as a function of an administrator encryption key; encrypting the decrypted expired decryption key as a function of the generated current encryption key; and making the previously encrypted expired description key available to said user of said terminal.

6. A method as claimed in claim 3, wherein decrypting said encrypted expired decryption key includes obtaining a decrypted session key by decrypting an encrypted session key as a function of the generated decryption key stored in said cryptographic medium, and decrypting an encrypted expired decryption key as a function of said session key.

7. A system for recovering at least one expired decryption key comprising a processor for asymmetrically decrypting data encrypted in a terminal, after generation of a current cryptographic encryption key/decryption key pair, said generated current decryption key being used by a processor for asymmetrical decryption of other data in the terminal, said system including:

a certification authority device for obtaining said expired decryption key by decrypting an encrypted expired decryption key as a function of an administrator decryption key, the generated expired decryption keys being encrypted beforehand as a function of an administrator encryption key;

encrypting the decrypted expired decryption key as a function of the generated current encryption key;

making the previously encrypted expired description key available to said user of said terminal; and a memory arrangement for storing (a) said generated current cryptographic encryption key/decryption key pair in a cryptographic medium intended for a user of said terminal, (b) the encrypted expired decryption key as a function of the generated current encryption key in a database accessible to said user of said terminal; and a decryption management module for obtaining the expired decryption key by commanding decryption of the encrypted expired decryption key as a function of the generated current encryption key, executed at least in part in said cryptographic medium connected to said terminal.

8. A decryption management module for recovering at least one expired decryption key used by a processor for asymmetrically decrypting data encrypted in a terminal, after generation by a certification authority device and before registration of a current cryptographic encryption key/decryption key pair, said current decryption key being used by the processor for asymmetrical decryption of other data in the terminal, said decryption management module being configured for receiving from the certification authority device said expired decryption key stored in the certification authority device and encrypted as a function of the generated current encryption key, and for commanding decryption of the encrypted expired decryption key, executed at least in part in a cryptographic medium connected to said terminal, as a function of the generated encryption key stored in said cryptographic medium.

9. A decryption management module as claimed in claim 8, including means for searching in a database accessible to a user of said terminal for the encrypted expired decryption key that is required and identified by an application of the terminal.

10. A data processing terminal including a decryption management module for recovering at least one expired decryption key usable for asymmetrically decrypting data, after generation of a current cryptographic encryption key/decryption key pair, said current decryption key being usable for asymmetrical decryption of other data in the terminal, the data processing terminal being configured for obtaining said expired decryption key by commanding decryption of an encrypted expired decryption key, executed at least in part in a cryptographic medium connected to said terminal, as a function of the generated encryption key stored in said cryptographic medium.

11. A data processing terminal as claimed in claim 10, including means for searching in a database accessible to a user of said terminal for the encrypted expired decryption key that is required and identified by an application of said terminal.

12. A computer arrangement adapted to be performed in a system for recovering at least one expired decryption key used for asymmetrically decrypting data encrypted in a terminal, said expired decryption key having been suppressed after generation by a certification authority device and before registration of a current cryptographic encryption key/decryption key pair said generated decryption key being used for asymmetrical decryption of other data in the terminal, said computer arrangement including a machine-readable medium or storage device including instructions adapted to cause the computer arrangement to perform the following operation:

receiving from the certification authority device said expired decryption key stored by the certification authority and encrypted as a function of the generated current encryption key, decrypting the encrypted expired decryption key as a function of an administrator decryption key, the generated expired decryption key being encrypted beforehand as a function of an administrator encryption key;

encrypting the decrypted expired decryption key as a function of the generated current encryption key;

making the previously encrypted expired description key available to said user of said terminal; and decrypting an encrypted expired decryption key as a function of the generated decryption key, executed at least in part in a cryptographic medium connected to said terminal, to obtain said expired decryption key.

* * * * *